Patented June 13, 1950

2,511,811

UNITED STATES PATENT OFFICE 2,511,811

PREPARATION OF GRANULAR POLYMERIZATION PRODUCTS

Massimo Baer, Springfield, Mass., assignor to Monsanto Chemical Company, St. Louis, Mo., a corporation of Delaware No Drawing. Application December 6, 1947, Serial No. 790,222

16 Claims. (Cl. 260—23)

This invention relates to vinyl halide-containing polymeric products. More particularly, this invention relates to vinyl halide-containing polymeric products in a finely divided state.

In my co-pending patent application, Serial No. 691,412, filed August 17, 1946, now Patent Number 2,476,474, there is disclosed and claimed a process for the polymerization of vinyl halide-containing materials in aqueous suspension, there being dissolved in the aqueous phase thereof an heteropolymer of vinyl acetate and maleic acid or anhydride. This process leads to granular products of high quality. However, considerable difficulty is encountered in obtaining the granular products with the degree of fineness sometimes desired.

It is an object of this invention to provide vinyl halide-containing polymeric products in the form of fine grains. A particular object of this invention is to provide a method for reducing the particle size of the granular product obtained by polymerizing vinyl halide-containing materials in the presence of an aqueous solution of an heteropolymer of vinyl acetate and maleic acid or anhydride.

These and other objects are accomplished according to this invention by polymerizing vinyl halide-containing materials in an aqueous suspension, the aqueous phase thereof having dissolved therein an heteropolymer of vinyl acetate and maleic acid or anhydride, in the presence of a compound from the group consisting of unsaturated aliphatic acids having 10-20 carbon atoms, hydroxyl group-substituted aliphatic acids having 10-20 carbon atoms and partial esters of polyhydric alcohols and aliphatic acids, said acids having 10-20 carbon atoms.

The following examples are illustrative of the present invention, but are not to be construed as limitative thereof. Where parts are mentioned, they are parts by weight.

In each example in Table I, the procedure used is that given below.

200 parts of water are placed in a glass-lined autoclave and then the indicated amount of heteropolymer of vinyl acetate and maleic anhydride is added and dissolved in the water by heating and stirring the mixture. Thereafter, 0.2 part of lauroyl peroxide and the glyceryl mono-octadecanoate are introduced and the air in the autoclave is swept out with vinyl chloride gas. The autoclave is then sealed and 100 parts of monomeric vinyl chloride are introduced. The resulting mixture is heated and stirred at 50° C. for 20 hours. As a result of this treatment, substantially all of the vinyl chloride is polymerized, i. e., more than 95%. The polymeric products which comprise powders possessing varying degrees of coarseness are recovered from the suspending medium by centrifuging the product. The recovered polymers are washed with water and dried.

The heteropolymer used in the examples is made by copolymerizing one gram molecular weight of vinyl acetate with one gram molecular weight of maleic anhydride in the presence of 60 cc. of benzene and 0.13 gram of benzoyl peroxide at 50° C. for 72 hours. The product, after being freed from the benzene by drying at 60–70° C., is in the form of a fine powder.

Table

| Example | Heteropolymer | Glyceryl Monooctadecanoate | Screen Analysis of the Product | | | |
|---|---|---|---|---|---|---|
| | | | >40-mesh | >60-mesh | >80-mesh | <80-mesh |
| | Parts | Parts | Per cent | Per cent | Per cent | Per cent |
| I | 0.4 | | 1.5 | 11.2 | 41.3 | 46 |
| II | 0.3 | | 1.5 | 5.9 | 34.2 | 59 |
| III | 0.2 | 0.4 | 0.6 | 0 | 8.8 | 90.6 |
| IV | 0.3 | 0.4 | 0 | 0 | 8.4 | 91.6 |
| V | 0.4 | 0.4 | 0 | 0.5 | 15.0 | 84.5 |
| VI | 0.3 | 0.1 | 0.3 | 2.4 | 31.4 | 66.1 |
| VII | 0.3 | 0.2 | 0 | 0.4 | 19.0 | 80.6 |
| VIII | 0.3 | 0.4 | 0 | 0.4 | 9.3 | 90.3 |
| IX | 0.3 | 0.8 | 0 | 0.3 | 3.7 | 96.0 |
| X | 0.3 | 0.4 | 0 | 0 | 12.5 | 87.5 |

It is apparent from consideration of the screen analyses of the products of the above examples that the inclusion of glyceryl mono-octadecanoate in the polymerization charges has an unexpected and pronounced effect on the particle size of the products. Other particle size-reducing agents of the invention are also effective in this respect.

The amount of the particle size-reducing agent that is used may be substantially varied. Thus, as little as 0.01% based on the amount of monomeric material has a definite effect on the particle size of the polymeric product. Usually, not more than 5% is desirable since in some cases the effectiveness of the agent falls off when large amounts are used. A preferred range of proportions is 0.05–2% of the agent based on the amount of the monomeric material.

Various unsaturated aliphatic acids containing 10–20 carbon atoms, hydroxy aliphatic acids containing 10–20 carbon atoms, and partial esters of polyhydric alcohols and aliphatic acids, the acid residues thereof containing 10–20 carbon atoms may be used in accordance with the invention.

Examples of hydroxy acids having 10–20 carbon atoms which may be used alone or in the form of partial esters as particle size reducing agents in accordance with the invention include both saturated and unsaturated hydroxy acids such as 12-hydroxy-octadecanoic acid, 9,10-hydroxy-octadecanoic acid, 12-hydroxy-dodecanoic acid, 16-hydroxy-hexadecanoic acid, 11-hydroxy-hexadecanoic acid, 10 - hydroxy-octadecanoic acid, 3,12-dihydroxy-palmitic acid, 9,10,16-hydroxy-hexadecanoic acid, 9,10,12,13-hydroxy-octadecanoic acid 16 - hydroxy-7-hexadecenoic acid, 12-hydroxy-9-octadecenoic acid.

Examples of unsaturated aliphatic acids which may be employed, alone or in the form of partial esters are mono-olefinic unsaturated aliphatic acids, such as 7-hexadecenoic acid, 10-undecenoic acid, 13-docosenoic acid and 9-octadecenoic acid; diolefinic-unsaturated aliphatic acids such as 9,12-octadecadienoic acid; triolefinic-unsaturated aliphatic acids such as 9,12,15-octadecatrienoic acid, 9,11,13-octadecatrienoic acid; substituted olefinic acids, for example, such hydroxy olefinic acids as 16-hydroxy-7-hexadecenoic acid and 12 - hydroxy - 9 - octadecenoic acid; halogenated unsaturated acids, for example, monochloro-9-octadecenoic acid, monochloro - 12 - hydroxy-9-octadecenoic acid and halogenated acids derived by dehydration of castor oil acids followed by chlorination; acetylenic unsaturated aliphatic acids, such as 7-hexadecynoic, 9-octadecynoic and 13-docosynoic acids.

Among the polyhydric alcohols from which the partial esters may be made are glycerin, mannitol, sorbitol, glucose, erythritol, pentaerythritol, glycols such as ethylene glycol, propylene glycol, diethylene glycol, triethylene glycol, tetraethylene glycol, etc. Various saturated and unsaturated aliphatic acids may be reacted with the polyhydric alcohols in making the partial esters. A preferred group of partial esters are those containing a single ester linkage. However, partial esters containing more than one ester linkage may be used.

The acids used in making the partial esters may be saturated or unsaturated aliphatic acids containing 10–20 carbon atoms. Examples of such acids include the unsaturated acids and hydroxy acids set forth above which are also effective in the unreacted state as particle size reducing agents.

Examples of saturated fatty acids other than those set forth above, which may be employed in preparing the partial esters are decanoic acid, undecanoic acid, dodecanoic acid, tridecanoic acid, tetradecanoic acid, pentadecanoic acid, hexadecanoic acid, heptadecanoic acid, octadecanoic acid and nonadecanoic acid. These acids may have straight or branched chains, or substituted chains, and may be substituted, for example, with chlorine or other halogen atoms, as for example, monochloroctadecanoic acid, and the like.

Specific partial esters coming within the scope of the invention include glyceryl mono-hexadecanoate, glyceryl mono-dodecanoate, glyceryl mono - 9 - octadecenoate, glyceryl mono-12-hydroxy-octadecanoate, sorbitan monododecanoate polyoxy alkylene derivative, sorbitan mono-octadecanoate polyoxy alkylene derivative, propylene glycol mono - octadecanoate, ethylene glycol mono-octadecanoate, diethylene glycol mono-octadecanoate and sorbitan mono-octadecanoate. These and other particle size reducing agents of the invention may be substituted for the glyceryl mono-octadecanoate in the examples of Table I with generally similar results.

A preferred group of particle size reducing agents are those which are free from unsaturation, i. e., saturated hydroxy acids and partial esters of polyhydric alcohols with saturated acids such as those mentioned above.

The heteropolymers of vinylacetate and maleic acid or anhydride used in the process of the invention may be made by usual methods of producing such polymeric products, e. g., in solution, in mass, or in a liquid which is a solvent for the monomeric materials, but not for the heteropolymer. Illustrative examples are set forth in my copending patent application, Ser. No. 691,412, filed August 17, 1946. A particularly preferred procedure is set forth in my co-pending application Serial No. 790,221, filed December 6, 1947, whereby especially high molecular weight products are obtained by polymerization in the presence of a small amount of a material which is a solvent for the monomeric materials, but not for the heteropolymer.

Usually maleic anhydride is preferred over maleic acid as the copolymerizing material in view of the faster polymerization rates which result and the greater solubility of the anhydride. Since on solution of the vinyl acetate-maleic anhydride heteropolymer in water, the anhydride groups hydrolyze to carboxyl groups, there is no disadvantage in using this heteropolymer.

In preparing the heteropolymers in the presence of a solvent for the monomers which is a non-solvent for the polymer, such liquids may be used as benzene, toluene, xylene, hexane, chlorobenzene, chlorotoluene, chloroxylene, dichloroethylene, trichloroethylene and the corresponding bromo and fluoro compounds.

The heteropolymer - containing suspending agents may be made by polymerizing mixtures of vinyl acetate and maleic acid or anhydride in varying molar ratios, e. g., from 1:9 to 9:1. Usually, it is preferred that the ratio of maleic acid or anhydride to vinyl acetate does not exceed 1:1 since the use of an excess of maleic acid or anhydride may be undesirable in some cases. However, it may be desirable that the ratio of vinyl acetate to anhydride exceed 1:1. For example, the ratio may be as high as 9:1, as pointed out above.

Heteropolymers of vinyl acetate and maleic acid or anhydride possess a substantial solubility in water without the use of compounds forming salts therewith. Usually the aqueous solutions thereof are clear. However, the products resulting from polymerizing mixtures of vinyl acetate and maleic acid or anhydride containing a substantial molar excess of vinyl acetate, i. e., more than 1.5–2.0 mols of vinyl acetate for every mol of maleic acid or anhydride, tend to form hazy aqueous solutions. While these heteropolymers may be used as suspending agents and are comprehended by the present invention, it is preferred to use the heteropolymers which form clear aqueous solutions without the addition of salt-forming materials since these heteropolymers are more effective as suspending agents.

In carrying out the process of the invention, the polymerizing temperature may be substantially varied, and the temperature employed is governed by the particular characteristics desired in the polymeric material and the nature of the material being polymerized. In the case of vinyl halides and many mixtures of vinyl halides and materials copolymerizable therewith, temperatures of 30-100° C. are usually employed. Usually, only a small concentration of the dispersing agent of the invention is necessary. For example, 0.005-2.0% and, more particularly, 0.01-0.5% based on the amount of water used, is usually sufficient. However, larger amounts may be employed when desired, for example, up to the limit of solubility of the heteropolymer in the water. The optimum quantity of the dispersing agent depends upon a number of factors, for example, the ratio of water to monomer. Thus, as the water:monomer ratio is increased, the ratio of suspending agent to water may be decreased. Another factor affecting the amount of the suspending agent required is the rate at which the particular charge polymerizes. In general, the faster the rate of polymerization, the smaller is the amount of suspending agent required. Other factors affecting the optimum amount of suspending agent include the degree of fineness desired in the polymeric product and the speed of agitation.

In carrying out the polymerization process of the invention, it is generally preferred that a water:monomer weight ratio of at least 1:1 be used, but generally, the water:monomer ratio does not exceed 9:1. The dispersing agent concentrations mentioned above may be used within these limits of water:monomer ratios.

As indicated above, it is desirable in carrying out the polymerization process of the invention to substantially free the atmosphere above the polymerizing mixture from oxygen by replacing the air prior to polymerization with carbon dioxide, vinyl chloride, nitrogen or other inert gas. This may be done by sweeping out the air with a stream of inert gas or by subjecting the polymerization charge to partial vacuum, thereby sweeping out the air with vapors from the charge.

The process of this invention is useful in the polymerization of vinyl halides, e. g., vinyl chloride, vinyl bromide, etc. and the copolymerization of vinyl halides with such copolymerizable water-insoluble unsaturated compounds as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes such as butadiene, chloroprene; amides such as acrylic acid amide, acrylic acid anilide; nitriles, such as acrylic nitrile; esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like.

Preferably, in the case of copolymerization, a predominant portion, i. e., more than 50% by weight, of the mixture of monomers is a vinyl halide, especially vinyl chloride.

A particularly preferred embodiment of the invention comprises the polymerization of a mixture of vinyl chloride and an ester of an $\alpha,\beta$-unsaturated dicarboxylic acid such as diethyl maleate, in which 5-20 parts by weight of the ester are used for every 95-80 parts by weight of vinyl chloride. Among the preferred esters of $\alpha,\beta$-unsaturated dicarboxylic acids are the alkyl esters in which the alkyl group contains 2-8 carbon atoms.

In place of lauroyl peroxide used in the examples, other water-insoluble catalysts may be used such as benzoyl peroxide, ditertiary butyl peroxide, oleyl peroxide, toluyl peroxide and the like. Mixtures of two, three or more of these and other catalysts may be used when desired. In certain cases, the catalyst may be eliminated, for example, when rapid polymerization is obtained in the absence of catalyst. In certain cases, the action of light may be helpful in expediting the polymerization.

The above catalysts are also illustrative of catalysts which may be used in making the heteropolymer dispersing agent.

The foregoing description is given in illustration and not in limitation of the invention as set forth in the appended claims.

What is claimed is:

1. In a process wherein a polymerizable material containing a vinyl halide from the group consisting of vinyl chloride and vinyl bromide is polymerized while dispersed in an aqueous medium having dissolved therein as a dispersing agent a heteropolymer of vinyl acetate and a substance from the group consisting of maleic acid and maleic anhydride, the step which comprises incorporating in the aqueous medium prior to polymerization 0.01% to 5%, based on the monomeric materials, of a particle size reducing agent from the group consisting of unsubstituted unsaturated aliphatic carboxylic acids having from 10 to 20 carbon atoms, hydroxyl group-substituted aliphatic carboxylic acids containing from 10 to 20 carbon atoms, halogen substituted unsaturated aliphatic carboxylic acids having from 10 to 20 carbon atoms and partial esters of polyhydric alcohols and aliphatic carboxylic acids, said alcohols having from 2 to 8 carbon atoms and said acids having from 10 to 20 carbon atoms.

2. A process as defined in claim 1 in which the polymerizable material is vinyl chloride.

3. A process as defined in claim 1 in which the aqueous dispersion contains a mixture of vinyl chloride and an unsaturated compound copolymerizable therewith.

4. A process as defined in claim 3 in which the copolymerizable compound is a vinyl ester of a lower aliphatic acid, said acid having from 2 to 4 carbon atoms.

5. A process as defined in claim 4 in which the vinyl ester is vinyl acetate.

6. A process as defined in claim 1 in which the particle size reducing agent is a hydroxyl group-substituted aliphatic carboxylic acid.

7. A process as defined in claim 6 in which the acid is a saturated acid.

8. A process as defined in claim 1 in which the particle size reducing agent is an unsubstituted unsaturated aliphatic carboxylic acid.

9. A process as defined in claim 1 in which the particle size reducing agent is a partial ester of a polyhydric alcohol and an aliphatic carboxylic acid, said alcohol having from 2 to 8 carbon atoms and said acid having from 10 to 20 carbon atoms.

10. A process as defined in claim 9 in which the partial ester is a glyceryl partial ester.

11. A process as defined in claim 10 in which the partial ester is glyceryl monostearate.

12. A process as defined in claim 11 in which the vinyl halide is vinyl chloride.

13. A process as defined in claim 1 in which the particle size reducing agent is 12-hydroxystearic acid.

14. A process as defined in claim 13 in which the vinyl halide is vinyl chloride.

15. A process as defined in claim 1 in which the aqueous dispersion contains a mixture of vinyl chloride and a compound copolymerizable therewith comprising an alkyl ester of $\alpha,\beta$-unsaturated dicarboxylic acid in which the alkyl group contains from 2 to 8 carbon atoms.

16. A process as defined in claim 15 in which the copolymerizable compound is diethyl maleate.

MASSIMO BAER.

No references cited.

Certificate of Correction

Patent No. 2,511,811

June 13, 1950

MASSIMO BAER

It is hereby certified that error appears in the printed specification of the above numbered patent requiring correction as follows:

Column 5, line 73, after the word "acrylic", second occurrence, insert *acid*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.* particle size reducing agent is an unsubstituted unsaturated aliphatic carboxylic acid.

9. A process as defined in claim 1 in which the particle size reducing agent is a partial ester of a polyhydric alcohol and an aliphatic carboxylic acid, said alcohol having from 2 to 8 carbon atoms and said acid having from 10 to 20 carbon atoms.

10. A process as defined in claim 9 in which the partial ester is a glyceryl partial ester.

11. A process as defined in claim 10 in which the partial ester is glyceryl monostearate.

12. A process as defined in claim 11 in which the vinyl halide is vinyl chloride.

13. A process as defined in claim 1 in which the particle size reducing agent is 12-hydroxystearic acid.

14. A process as defined in claim 13 in which the vinyl halide is vinyl chloride.

15. A process as defined in claim 1 in which the aqueous dispersion contains a mixture of vinyl chloride and a compound copolymerizable therewith comprising an alkyl ester of $\alpha,\beta$-unsaturated dicarboxylic acid in which the alkyl group contains from 2 to 8 carbon atoms.

16. A process as defined in claim 15 in which the copolymerizable compound is diethyl maleate.

MASSIMO BAER.

No references cited.

Certificate of Correction

Patent No. 2,511,811      June 13, 1950

MASSIMO BAER

It is hereby certified that error appears in the printed specification of the above numbered patent requiring correction as follows:

Column 5, line 73, after the word "acrylic", second occurrence, insert *acid*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*

Certificate of Correction

Patent No. 2,511,811                                                              June 13, 1950

MASSIMO BAER

It is hereby certified that error appears in the printed specification of the above numbered patent requiring correction as follows:

Column 5, line 73, after the word "acrylic", second occurrence, insert *acid*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*